METHOD OF MANUFACTURING A PHOTOCONDUCTING DEVICE

Filed March 12, 1964

INVENTORS
HERMANN G. GRIMMEISS
HEINZ SCHOLZ
BY
Frank R. Jifari
AGENT

United States Patent Office 3,261,080

Patented July 19, 1966

3,261,080

METHOD OF MANUFACTURING A PHOTOCONDUCTING DEVICE

Hermann Georg Grimmeiss and Heinz Scholz, Aachen, Germany, assignors to North American Philips Company, Inc., New York, N.Y., a corporation of Delaware Filed Mar. 12, 1964, Ser. No. 351,468

Claims priority, application Netherlands, Apr. 3, 1963, 291,095

9 Claims. (Cl. 29—155.5)

The invention relates to a method of manufacturing a photoconducting device comprising a semiconductor body of gallium phosphide provided with electrodes, or of manufacturing a semiconductor body of galliumphosphide for use in a photoconducting device, in which the galliumphosphide body is converted at least partly into photoconducting material by diffusing in copper as an activator. The invention furthermore relates to a photoconducting device or a semiconductor body of galliumphosphide manufactured by a method according to the invention.

In "Journal Physical Chemistry of Solids," vol. 23, pages 509 to 511, there is described a method of manufacturing high-ohmic photoconducting galliumphosphide activated by copper. To this end an n-type conducting galliumphosphide body and a quantity of copper and phosphorus are heated in a closed quartz tube at 1000° C. for 72 hours in order to diffuse the copper into the galliumphosphide. Since the copper reacts with the galliumphosphide, while forming a melt, already at a temperature of about 750° C. to 850° C., the copper must be arranged separately from the galliumphosphide in this known method in a manner otherwise known for such diffusion treatments and a small quantity of phosphorus is added in order to avoid decomposition of the galliumphosphide during the diffusion treatment. It is furthermore common practice to carry out such a treatment in an inert atmosphere, particularly in vacuo, and to preheat the quartz tube prior to sealing, for example, at 200° C. to 400° C. in order to remove impurities as far as possible. After the temperature treatment at 1000° C. the quartz tube is chilled in water in order to avoid separation of copper from the galliumphosphide.

During one of the many series of experiments carried out essentially in accordance with the method described above for the manufacture of photoconducting galliumphosphide a new method was accidentally found, which yielded in a simple manner galliumphosphide bodies having a markedly improved photoconductivity. With the experiment concerned the quantity of copper had been in contact with the galliumphosphide body due to an unintentional manipulation during the preheating process intended to purify the material, prior to sealing of the quartz tube and prior to the diffusion treatment, so that the galliumphosphide was not, as usual, yellow or orange transparent, but it was discoloured to black. Although the body seemed to be worthless due to this discolour, it was used nevertheless, after the copper had been separated from the body, simultaneously with a further series and heated for 30 hours at about 950° C. It was a surprise to find that the galliumphosphide body had the conventional transparent colour after this treatment and that it had a materially improved photoconductivity as compared with the bodies treated simultaneously in the conventional manner. Afterwards this may be accounted for by the fact that the galliumphosphide body has assumed, apparently by its direct contact with copper, at its surface a high copper concentration at the comparatively low preheating temperature of about 200° C. to 400° C., during which no troublesome formation of a melt occurs, said concentration being distributed in the body during the subsequent diffusion treatment.

On the basis of this recognition the invention provides a novel, improved method of the kind set forth, in which galliumphosphide of a particularly high photoconductivity can be obtained. In accordance with the invention the galliumphosphide body is brought, at least locally, into contact with a copper-containing material, preferably with copper itself, and heated at a temperature lying between about 300° C. and 750° C., copper being absorbed at the body surface and diffused into the part to be converted by heating it at a temperature lying between about 700° C. and 1100° C. Subsequent to the first-mentioned heating the free copper or copper-containing material left, if any, is removed from the body at least to an extent such that this remaining copper or material can no longer give rise to a marked formation of melt during the last-mentioned thermal treatment.

Owing to the direct contact between copper and galliumphosphide a higher concentration of copper can be absorbed in or on the surface during the first heating in the lower temperature region, so that this galliumphosphide usually exhibits discolouring to black. By the control of the duration and the temperature the concentration of copper to be absorbed can be regulated. The first-mentioned heating is preferably carried out at a temperature lying between about 350° C. and 500° C.

Prior to the second heating, during which the copper is diffused into the body from the surface, the remaining copper or copper-containing material, i.e. that part of the copper which has not reacted with the surface of the galliumphosphide and is not absorbed in the surface, is preferably completely removed in order to avoid completely a troublesome formation of melt at the higher temperature, although in some cases a small residue, which can practically not give rise to the formation of a melt, is allowed to stay, particularly if the copper is vapour-deposited in such a thin layer that any residue after the first heating is absorbed in the body practically without a troublesome or marked formation of melt during the second heating. The temperature and the duration and the surface concentration obtained during the first heating may be chosen at will in order to convert the body wholly or partly into photoconducting material. The diffusion is preferably carried out during the second heating in the temperature region from about 800° C. to 1000° C., since at a lower temperature the diffusion rate into the body is materially lower and at a higher temperature it is more difficult to prevent the crystals from being affected.

During the first-mentioned heating it is advantageous to apply the copper-containing material, preferably copper itself, for example in the form of a compact body at least locally to the galliumphosphide body, so that it can be simply removed after the first heating. It is necessary for the copper and the galliumphosphide body to be in contact with each other. It is sufficient for the copper to be only locally in contact with the galliumphosphide body, since it has been found that the copper can nevertheless be spread, by surface diffusion, fairly rapidly throughout the surface to a uniform extent.

In a further embodiment of the method according to the invention, which is also suitable for converting only a surface portion of the body, the copper can be vapour-deposited in such a thin layer on the galliumphosphide body that during the subsequent or simultaneous heating of the body this layer is absorbed substantially completely in the body and does substantially not give rise to the formation of a melt during the second heating.

Particularly favourable results are obtained when, during the first heating, a trace of oxygen is provided in the ambience which is otherwise inert, although in certain cases oxygen may be added afterwards. The oxygen pressure in the ambience depends upon the temperature and the duration of the treatment and upon the starting material. A favourable value is attained, for example, if the first heating is carried out in air with a vapour pressure between 0.05 and 10 mms. Hg, for example 0.5 mm. The partial pressure of the oxygen is, preferably, not chosen so high that a marked oxidation of the copper might interrupt the contact between the copper and the body, but on the other hand it is chosen so that a discoloration to black is obtained on the galliumphosphide surface. As an alternative, however, an inert atmosphere, for example vacuum or argon, may lead to a discoloration to black, though this reaction is performed considerably more slowly. It has been found that the galliumphosphide crystals manufactured in an atmosphere containing a trace of oxygen has a particularly high photoconductivity. Probably the oxygen is incorporated in the galliumphosphide as a donor and performs at the same time a compensating and co-activating function, so that photoconducting gallium phosphide having a high concentration of the copper operating as an acceptor and a great sensitivity is obtained, and if desired, compensation is capable of yielding high-ohmic material. The second heating is preferably carried out in vacuo, but it may be desirable to provide copper separately from the body and, if necessary, a small quantity of phosphorus in the ambience.

The starting body is preferably n-type conducting galliumphosphide and the method is preferably carried out so that in the finally converted portion the prevailing donor concentration and the acceptor concentration (copper) are substantially equal to each other, so that practically intrinsic conducting, high-ohmic p-type conducting or high-ohmic n-type conducting material, having for example a resistivity of $10^8$ ohm-cm. is obtained. It has been found, however, that due to the particular photoconductivity of the bodies treated in accordance with the invention comparatively low-ohmic n-type conducting galliumphosphide, having for example a resistivity of $10^4$ ohm-cm. provides a photoconductor which may be satisfactorily employed for many uses. It is also possible to diffuse afterwards a donor into the body in order to obtain the desired compensation of the copper.

The method according to the invention may be employed to convert only part of the galliumphosphide body into photoconducting material, while on other parts other circuit elements may be provided, for example for optoelectronic combination, electronic combinations of radiation sources and photoconductors in one body. The invention is, however, also particularly important and suitable for the manufacture of practically homogeneously copper-doped photoconducting bodies of galliumphosphide, which may be satisfactorily used in separate photocells, since they have a very high sensitivity for the blue part of the spectrum, which is particularly important, for example, as flame detectors.

The invention will now be explained more fully with reference to a few diagrammatical figures and embodiments.

Figure 1:
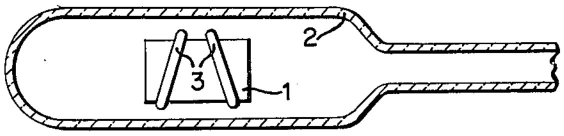
FIGS. 1 and 2 show in a sectional view diagrammatically two successive stages of the method according to the invention.

The starting material was formed by a crystalline galliumphosphide pellet 1 (see FIG. 1, which shows a plan view of the pellet), which had the dimensions of about 5 x 4 x 0.3 cm.$^3$, manufactured in a conventional manner from a melt. The crystal was n-type conducting and had a concentration of free electrons of about $10^{17}$/cm.$^3$.

This crystal 1 was arranged in a quartz bulb 2 and on the crystal 1 a number of loose lengths of wire 3 of copper (length 6 ms. and a diameter of about 1 mm.) are arranged, which were previously etched in nitric acid and purified. The quartz bulb 2 with its contents was preheated for a few hours at about 250° C. in a vacuum of about $10^{-6}$ mm. Hg in order to evaporate any residual impurities.

Then the first stage of the method according to the invention is carried out, in which the assembly (copper 3 in contact with the galliumphosphide body 3) is heated at about 400° C. for about five hours in an atmosphere containing a trace of oxygen, i.e. in air having a pressure of about 0.5 mm. Hg. The galliumphosphide crystal 1 thus absorbs at its surface a quantity of copper, and is thus discoloured to black substantially throughout its surface. The copper 3 then absorbs a slight quantity of gallium and phosphorus. The best results were obtained when, as in the present case, the pressure of the oxygen was not so high that the metal gloss of the copper 3 vanished.

After this first heating the black coloured galliumphosphide crystal is separated from the residual copper 3, simply by removing the length of wire of copper 3 from the body.

Figure 2:
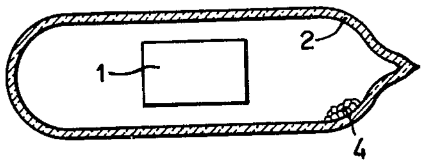

Then the second heating (see FIG. 2) is carried out, to which end the galliumphosphide crystal pellet 1 is heated in high vacuo of $10^{-6}$ mm. Hg in the sealed quartz bulb 2 at a temperature of about 900° C. for about 24 hours. Although it has been found not to be necessary, there may, if desired, be provided a small quantity of copper 4 in the quartz bulb 2, separately from the galliumphosphide body 1, and, if desired, also a small quantity of phosphorus in order to avoid decomposition. During this heating the copper is distributed substantially homogeneously in the galliumphosphide 1 by diffusion and the black colour disappears and the crystal 1 again assumes the conventional transparent colour. It should be noted that in accordance with the donor concentration in the starting material the duration and the temperature of the first heating, determining the quantity of copper acceptor to be absorbed, are preferably chosen so that a high-ohmic substantially intrinsic or weak n-type conducting or weak p-type conducting crystal is obtained by compensation or comparatively low-ohmic n-type conducting material is obtained.

Figure 3:
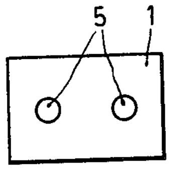
FIG. 3 is a plan view of a photoconducting galliumphosphide body according to the invention, provided with electrodes.
Figure 4:
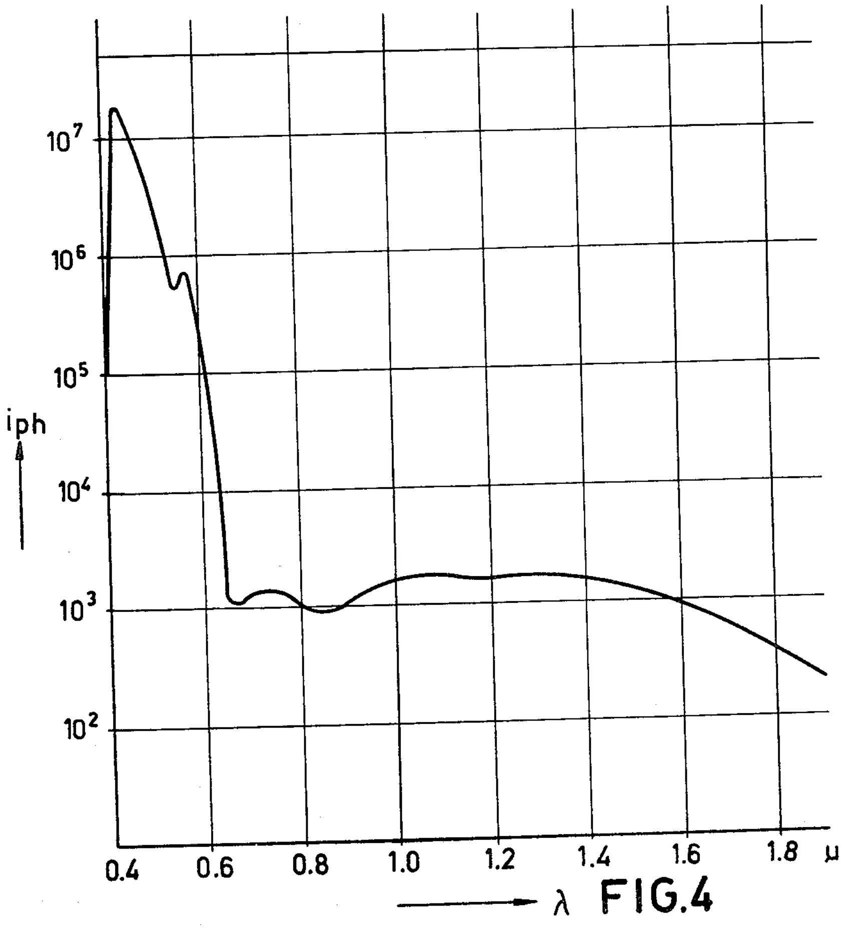
FIG. 4 shows a graph of the spectral sensitivity of a photoconducting device manufactured in accordance with the invention.

The crystal thus obtained appeared to be weak n-type conducting and had a resistivity in the dark of about $10^9$ ohm-cm. Two tin contacts 5 were alloyed on the crystal 1 at a distance of 1 mm. from each other (see FIG. 3) at a temperature of about 600° C. for a few seconds. The dark resistance was about $10^{11}$ ohm and under a radiation of an intensity of about $10^{12}$ quanta/sec./cm.$^2$ the spectral distribution shown in FIG. 4 was obtained. In FIG. 4 the photo-current $I_{ph}$ is plotted in arbitrary units at a constant voltage between the contacts of about 10 v. logarithmically on the ordinate, while the wavelength $\lambda$ is plotted in microns on the abscissa. It is apparent from FIG. 4 that the photoconducting bodies manufactured in accordance with the invention have a particularly satisfactory sensitivity in the blue part of the spectrum. It appeared furthermore that this photoconductivity can be reduced by simultaneous irradiation with infrared rays of a wavelength of about 1.2$\mu$ to $10^{-2}$ and $10^{-3}$, which means, in addition, a particularly satisfactory negative photoconductivity.

Similar favourable results were obtained by the following form of the method according to the invention. On a similar galliumphosphide crystal in a vacuum bell jar a very thin copper layer was vapour-deposited within about 1 to 2 seconds, said layer having a thickness of about 0.1 to 1$\mu$. The copper was evaporated from a tungsten helix, heated at about 2000° C. and containing a piece of copper. During the vapour-deposition the galliumphosphate crystal was located so near the helix that it assumed a temperature of about 400° C., so that the copper was simultaneously absorbed for the major part in the surface and such a thin copper layer remained that it was not necessary to remove it, since during the subsequent heating at 300° C. for 24 hours no marked formation of a melt occurred while the copper was substantially homogeneously absorbed in the body. The latter method is particularly suitable for converting only one part of the body by reduction of the duration or of the temperature of the last heating stage.

It should finally be noted that within the scope of the invention many variants are possible to those skilled in the art. The invention may be used with polycrystalline material and practically monocrystalline material. Instead of copper, use may be made of a copper-containing material, at least as far as the other components have no disturbing effect, for example a mixture of an inert material and copper.

What is claimed is:

1. A method of manufacturing a gallium phosphide semiconductor body for use in a photoconducting device, comprising contacting the gallium phosphide body with a copper-containing material and subjecting the contacting body and material to a first heating step at a temperature between about 300° C. and 750° C. causing copper to be absorbed into the surface of the gallium phosphide body, thereafter removing any residual free copper-containing material which could produce a substantial molten phase with the body during the subsequent heating step, and thereafter subjecting the body with the absorbed copper to a second heating step at a temperature between about 700° C. and 1100° C. to diffuse the absorbed copper into a region of the body, whereby the said gallium phosphide body region with the diffused copper exhibits high photoconductivity.

2. A method as set forth in claim 1 wherein the temperature of the first heating step is between about 350° C. and 500° C., and the temperature of the second heating step is between about 800° C. and 1000° C.

3. A method of manufacturing a photoconductive gallium phosphide semiconductor body for use in a photoconducting device, comprising contacting the gallium phosphide body with copper and subjecting the copper-contacted body to a first heating step at a temperature between about 300° C. and 750° C. in an inert atmosphere containing a trace of oxygen causing copper to be absorbed into the surface of the gallium phosphide body until the latter discolors, thereafter completely removing any excess free copper-containing material which could produce a molten phase with the body during the subsequent heating step, and thereafter subjecting the body with the absorbed copper to a second heating step at a temperature between about 700° C. and 1100° C. to diffuse the absorbed copper into a region of the body, whereby the said gallium phosphide body region with the diffused copper exhibits high photoconductivity.

4. A method as set forth in claim 3 wherein the oxygen-containing atmosphere comprises air having a vapor pressure between about 0.05 and 10 mm. Hg.

5. A method of manufacturing a photoconductive gallium phosphide semiconductor body for use in a photoconducting device, comprising depositing on the gallium phosphide body a thin layer of copper and subjecting the copper-coated body to a first heating step at a temperature between about 300° C. and 750° C. causing the copper coating to be substantially absorbed into the surface of the gallium phosphide body, and thereafter subjecting the body with the absorbed copper to a second heating step at a temperature between about 700° C. and 1100° C. without producing a molten phase to diffuse the absorbed copper into a region of the body, whereby the said gallium phosphide body region with the diffused copper exhibits high photoconductivity.

6. A method as set forth in claim 5 wherein a trace of oxygen is provided in the atmosphere for the first heating step.

7. A method of manufacturing a photoconductive device comprising a gallium phosphide semiconductor body, comprising contacting the gallium phosphide body with a copper-containing material and subjecting the contacting body and material to a first heating step at a temperature between about 300° C. and 750° C. causing copper to be absorbed into the surface of the gallium phosphide body until the latter discolors, thereafter removing any residual free copper-containing material which could produce a molten phase with the body during the subsequent heating step, thereafter subjecting the body with the absorbed copper to a second heating step at a temperature between about 700° C. and 1100° C. to diffuse the absorbed copper throughout the body and until the discoloration disappears, whereby the said copper-activated gallium phosphide body with the diffused copper exhibits high photoconductivity, and thereafter providing spaced electrodes contacting the body, said resultant device exhibiting a high photosensitivity in the blue region of the spectrum.

8. A method as set forth in claim 7 wherein the gallium phosphide body is n-type, and the amount of copper introduced is controlled so that the resultant body exhibits high resistance.

9. A method as set forth in claim 7 wherein the second heating step is carried out in an inert atmosphere.

No references cited.

JOHN F. CAMPBELL, *Primary Examiner.*

W. I. BROOKS, *Assistant Examiner.*